J. J. DE FREITAS.
CORN HARVESTER CUTTER
No. 105,784.  Patented July 26, 1870.
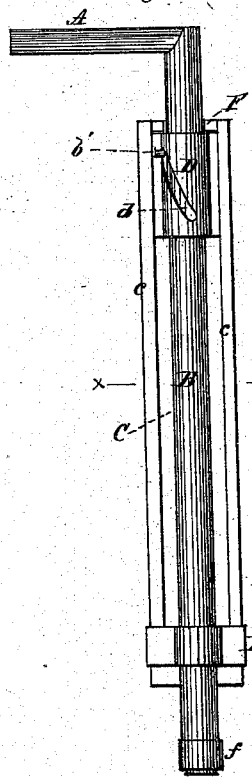
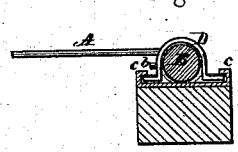
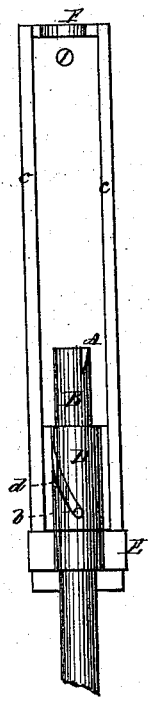
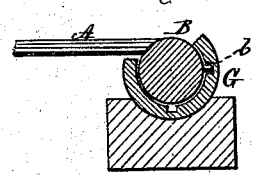
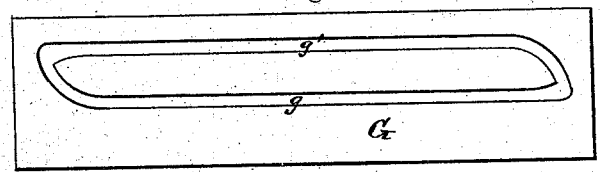
Witnesses.  Inventor.

United States Patent Office.

JOHN J. DE FREITAS, OF SPRINGFIELD, ILLINOIS.

Letters Patent No. 105,784, dated July 26, 1870.

IMPROVEMENT IN CORN-HARVESTER CUTTERS.

The Schedule referred to in these Letters Patent and making part of the same.

*To all whom it may concern:*

Be it known that I, JOHN J. DE FREITAS, of Springfield, in the county of Sangamon and in the State of Illinois, have invented a new and useful Improved Cutter, to be applied to Corn-Harvesters; and do hereby declare that the following is a full, clear, and exact description thereof, reference being had to the accompanying drawing making a part of this specification, in which—

Figure 1 is a plan view of my improved device, in which the cutter is shown in a horizontal position.

Figure 2 is a like view of the same, with the cutter drawn forward and placed in a vertical position;

Figure 3 is a cross-section on the line $x\ x$ of fig. 1;

Figure 4 is a like view of a modification of my device; and

Figure 5 is a plan view of the semicircular casing, opened outward, so as to show the guide-grooves.

Letters of like name and kind refer to like parts in each of the figures.

My invention has for its object the changing of the radial position of the reciprocating cutter of a corn-harvester, so as to cause it to advance and return in different paths; and, to this end, It consists in the employment of a spiral groove, or its equivalent, either permanently or temporarily fixed to or near the ends of the guide, for containing and controlling the longitudinal motion of the cutter-bar, in combination with a suitable pin, or its equivalent, secured to or within said bar, and working in said groove, as is hereinafter specified.

In the annexed drawing—

A represents the reciprocating cutter, secured at one end to a round bar, B, the opposite end, $b$, of which is suitably swiveled to or upon the reciprocating devices of the harvester.

Situated immediately beneath and supporting the rod B is a metal plate, C, the edges of which, $c$, extend upward and inward, and form grooves for the reception of the edges of a guide, D, the latter of which is so formed as to embrace the upper side of said rod and hold it loosely against the plate C, while at the rear end of said plate C is secured a strap, E, which passes over said rod B, and permits the latter to move freely through the same.

A short spiral slot, $d$, provided in and through the wall of the guide D, and a pin or stud, $b'$, secured to the rod B, and extending outward through said slot, completes the device, the operation of which is as follows:

The cutter A and rod B, being at the forward end of the plate, with said cutter in a horizontal position, (as shown in fig. 1,) upon drawing said rod backward, the guide D will be correspondingly moved, until arrested by the stop E, when the pin $b'$, following the curve of the slot $d$, will rotate the rod B, until the cutter occupies a vertical position, as seen in fig. 2.

Upon returning the cutter and rod to their former position, the guide will be carried forward, until arrested by a strap, F, situated at the end of the plate C, and, by the continued motion of the rod, the pin $b'$, following the curve of the slot $d$, causes said rod to rotate until the cutter acquires a horizontal position.

There are various ways in which the spiral groove can be caused to produce the above-named result, but as they would be modifications only of my invention, I will describe but one.

As seen in fig. 4, the bar B is contained within a guide, G, corresponding in shape with said rod, and having a sectional form of about two-thirds of a circle.

Extending longitudinally along the inner surface of the guide G, are two parallel grooves, $g$ and $g'$, having relative radial positions at a right angle with each other, one end of each groove being curved inward, so as to connect with the other, as shown in fig. 5.

The stud $b'$ being placed upon the opposite side of the bar B, so as to cause the cutter to occupy a horizontal position, when said pin is in the upper groove $g$, the device is ready for operation.

If, now, the bar B is drawn backward, the cutter will be held firmly in a horizontal position, until the stud reaches the curved end of the slot $g$, following which, it will rotate said bar until said cutter is placed in a vertical position, when said stud will have entered the lower groove $g$.

Upon the return stroke, the cutter will be held in a vertical position until near the end of the stroke, when the stud will run into the upper groove $g'$, and turn said cutter downward again to its horizontal position.

The latter arrangement will probably prove most desirable, as by it the cutter is rigidly held in position radially; and, when cutting, kept firmly down to its work.

The advantages possessed by this manner of operating the cutters are, that it dispenses entirely with springs and other devices for throwing said cutter from one plane to the other, and produces a positive, invariable motion of the cutter, with but little mechanism, and at a small cost.

Having thus fully set forth the nature and merits of my invention,

What I claim as new, and desire to secure by Letters Patent, is—

A spiral groove, either permanently or temporarily fixed at or near the ends of the guide, which contains the cutter-bar and controls its longitudinal motion, in combination with a suitable pin, secured to or within said bar, and working in said groove, substantially as and for the purpose specified.

In testimony that I claim the foregoing, I have hereunto set my hand this 26th day of February, 1870.

J. J. DE FREITAS.

Witnesses:
GEO. O. MARCY,
WM. MCCABE.